US005599252A

United States Patent [19]

Fukushima

[11] Patent Number: 5,599,252

[45] Date of Patent: Feb. 4, 1997

[54] TOROIDAL TYPE CONTINUOUSLY VARIABLE TRANSMISSION

[75] Inventor: Hiroshi Fukushima, Ayase, Japan

[73] Assignee: NSK Ltd., Tokyo, Japan

[21] Appl. No.: 317,559

[22] Filed: Oct. 4, 1994

[30] Foreign Application Priority Data

Nov. 2, 1993 [JP] Japan .................................. 5-274350

[51] Int. Cl.$^6$ .................................................. F16H 15/38

[52] U.S. Cl. ............................................ 476/40; 476/42

[58] Field of Search ........................................ 476/40, 42

[56] References Cited

U.S. PATENT DOCUMENTS

| | | | |
|---|---|---|---|
| 1,715,045 | 5/1929 | Richer | 476/40 |
| 2,060,884 | 11/1936 | Madlé | 476/40 |
| 2,445,066 | 7/1948 | Hayes | 476/42 |
| 2,560,180 | 7/1951 | Lesueur | 476/40 |
| 2,850,911 | 9/1958 | Kraus | 476/42 |
| 3,087,348 | 4/1963 | Kraus | 74/200 |
| 3,581,587 | 6/1971 | Dickenbrock | 476/40 |
| 4,386,536 | 6/1983 | Kraus | 476/40 |
| 4,909,092 | 3/1990 | Machida et al. | 74/200 |
| 4,955,246 | 9/1990 | Nakano | 74/200 |
| 4,974,466 | 12/1990 | Kraus et al. | 476/40 |
| 5,007,298 | 4/1991 | Machida | 74/200 |
| 5,027,669 | 7/1991 | Nakano | 476/42 |
| 5,218,877 | 6/1993 | Fukushima | 476/40 |
| 5,261,863 | 11/1993 | Jufuku et al. | 476/40 |
| 5,299,988 | 4/1994 | Fukushima et al. | 476/42 |
| 5,334,097 | 8/1994 | Tatara et al. | 476/40 |

FOREIGN PATENT DOCUMENTS

| | | | |
|---|---|---|---|
| 0389790 | 10/1990 | European Pat. Off. . | |
| 0466113 | 1/1992 | European Pat. Off. . | |
| 1217165 | 5/1966 | Germany . | |
| 62-71465 | 5/1987 | Japan . | |
| 62-184251 | 11/1987 | Japan . | |
| 62-199557 | 12/1987 | Japan . | |
| 1-275951 | 11/1989 | Japan | 476/46 |
| 2032540 | 5/1980 | United Kingdom . | |

OTHER PUBLICATIONS

Mark's Handbook For Mechanical Engineers, 8th Ed., (C) 1979 pp. 8–136 to 8–137.

*Primary Examiner*—Charles A. Marmor
*Assistant Examiner*—David Fenstermacher
*Attorney, Agent, or Firm*—Shapiro and Shapiro

[57] ABSTRACT

In a toroidal type continuously variable transmission, an input shaft and an output shaft are arranged coaxially with each other. The front end portion of the input shaft loosely penetrates an output disk. And an angular contact ball bearing is provided between a loading nut fixed to the front end of the input shaft and an output ring rotated together with the output disk.

9 Claims, 11 Drawing Sheets

35
36
41
9
37
39
38
13
12
14
12
8a
2
8
40
2a
4a
51
48
8
4
8a
45
47
49
43
50
46
44
42

35
36
41
9
37
39
38
13
12
14
2
8a
8
40
2a
4a
51
48
4
45a
47a
50a
46a
44
49
43
42

35
36a
41
9
37
39
38
13
12
14
2
12
8a
8
40
4a
51
48
2a
8
4
8a
45a
47a
49
50a
46a
44
43a
42

35a
41
36
44a
48a
37a
9a
49
50b
55
46b
56
47a
13
12
14
2'
12
8a
8
57
40
2a
4a
8
4'
8a
43
42b 35a
36
48b
49
50c
44a
55a
48b
41
9a
37a
56
46c
47a
13
12
14
57
12
2'
8
40
2a
8a
4a
8
4'
8a
43
42b 35b
41
36
54
53
48a
37a
52
49a
44b
50b
55
9a
13
12
14
2'
57
8
40
4a
4'
8a
43b
42b
46b
56
47a
12
2a
8a
8

35c
36
52a
49b
53a
50b
55
46b
56
54a
48a
37a
9a
41
47a
12
12
8a
2'
8
57
40
2a
4a
8
4'
8a
43b
42b 35a
41
36a
49
44a
50b
46b
56
48a
37a
9a
13
12
14
2'
47a
12
8a
8
57
40
2a
4a
8
4'
8a
43a
42b 15
19
16
21
9''
10'
32
2'''
8a''
8''
2a
17
4a
8''
8a''
4'''
24
26
25
18
20
22
23
34
30
27
33
29
28
31

TOROIDAL TYPE CONTINUOUSLY VARIABLE TRANSMISSION

BACKGROUND OF THE INVENTION

1. Field of the Invention

The present invention relates to a toroidal type continuously variable transmission which can be used, for example, as a transmission for an automobile. More specifically, the present invention relates to a toroidal type continuously variable transmission having means for absorbing the thrust load and the radial load applied to the output shaft and the input shaft.

2. Related Background Art

A toroidal type continuously variable transmission schematically shown in FIGS. 10 and 11 has been developed as the transmission for an automobile. In this toroidal type continuously variable transmission an input disk 2" (a first disk) is rotatably supported coaxially with an input shaft 1 (a first rotation shaft) as disclosed in Japanese Laid-Open Utility Model Application No. 62-71465, and so on. On the other hand, an output disk 4" (a second disk) is fixed at an end of an output shaft 3 (a second rotation shaft). Trunnions 6, which are rocked around their respective pivots 5, are set on the inner surface of the housing of the toroidal type continuously variable transmission or the trunnions 6 are supported by a support bracket provided in the housing. The pivots 5 are arranged in torsional or diagonal positions with respect to the input shaft 1 and the output shaft 3.

The pivots 5 are provided on both end portions of the side surface of each trunnion 6. The base portion of a shiftable shaft 7 is set at the center of each trunnion 6 so that the tilt angle of the shiftable shaft 7 can be controlled by rocking the trunnion 6 around the pivot 5. Power rollers 8' are rotatably supported around their respective shiftable shafts 7 supported by the trunnions 6. The power rollers 8' are pinched between the input disk 2" and the output disk 4".

The toroidal surfaces of the input disk 2" and the output disk 4", that is, the inner surfaces 2*a* and 4*a* thereof facing to each other are formed as concave surfaces having arched cross-section with centers that coincide with the axes of the pivots 5. Spherical peripheral surfaces 8*a*' of the power rollers 8' are in contact with the inner surfaces 2*a* and 4*a*.

Between the input shaft 1 and the input disk 2", a loading-cam type pressure device 9' is provided to elastically press the input disk 2" toward the output disk 4". The pressure device 9' comprises a cam plate 10 rotatable together with the input shaft 1 and a plurality of rollers 12' which are radially arranged and held by a holder 11. One side surface (the left side in FIGS. 10 and 11) of the cam plate 10 is formed as a cam surface 13' having circumferential projections and recesses. A similar cam surface 14' is formed on the outer side surface (the right side in FIGS. 10 and 11) of the input disk 2".

At the time of operation of the toroidal type continuously variable transmission constructed as described above, the cam plate 10 is rotated in association with rotation of the input shaft 1 so that the cam surface 13' presses the plurality of rollers 12' against the cam surface 14' at the outer side of the input disk 2". Therefore, the input disk 2" is pressed against the power rollers 8' and simultaneously the cam surfaces 13' and 14' are engaged with each other through the plurality of rollers 12 to rotate the input disk 2". The rotation of the input disk 2" is transmitted through the power rollers 8' to the output disk 4" so that the output shaft 3 fixed to the output disk 4" is rotated.

In order to change the ratio of the rotating speeds of the input shaft 1 and the output shaft 3, for example, in order to decelerate the rotating speed of the output shaft 3, the shiftable shafts 7 are tilted to rock the trunnions 6 around their respective pivots 5 to the position shown in FIG. 10 where the peripheral surfaces 8*a*' of the power rollers 8' are in contact with the inner surface 2*a* at a portion close to the center thereof as well as with the inner surface 4*a* at a portion close to the outer periphery of the output disk 4".

On the other hand, when the rotating speed of the output shaft is accelerated, the shiftable shafts 7 are tilted to rotate the trunnions 6 to the state shown in FIG. 11 where the peripheral surfaces 8*a*' of the power rollers 8' are in contact with the inner surface 2*a* of the input disk 2" at a portion close to the outer periphery as well as with the inner surface 4*a* of the output disk 4" at a portion close to the center thereof. If the tilt angles of the shiftable shafts 7 are controlled intermediate between the two states shown in FIGS. 10 and 11, intermediate ratios of the rotating speeds of the input shaft 1 and the output shaft 3 can be obtained.

FIG. 12 shows a more concrete construction of a toroidal type continuously variable transmission for an automobile disclosed in Japanese Utility Model Application No. 61-87523 (Japanese Laid-Open Utility Model Application No. 62-199557). The rotation of the crank shaft of the engine is transmitted through a clutch 15 to an input shaft 16 to rotate a cam plate 10' which is engaged through splines with the middle part of the input shaft 16. A pressure device 9" including the cam plate 10' pushes an input disk 2'" toward an output disk 4'" (leftwards in FIG. 12) and rotates the input disk 2'". The rotation of the input disk 2'" is transmitted through power rollers 8" to the output disk 4'".

The output disk 4'" is supported around the input shaft 16 by a needle bearing 17, while a cylindrical output shaft 18 integrally formed with the output disk 4'" is supported inside a housing 19 by an angular ball bearing 20. One end (right end in FIG. 12) of the input shaft 16 is rotatably supported in the housing 19 by a roller bearing 21, while the other end thereof is rotatably supported in the housing 19 through a sleeve 23 by an angular ball bearing 22.

A transmission gear 26 comprising a forward drive gear 24 and a backward drive gear 25 integrally formed with each other is engaged with the peripheral surface of the output shaft 18 through splines. In order to drive the vehicle forward, the transmission gear 26 is shifted rightwards so that the forward drive gear 24 comes to be directly engaged with a forward driven gear 28 provided in the middle part of a take-out shaft 27. In order to drive the car back, the transmission gear 26 is shifted leftwards so that the backward drive gear 25 is engaged, indirectly through an intermediate gear (not shown), with a backward driven gear 29 fixed in the middle part of the take-out shaft 27.

When the toroidal type continuously variable transmission as constituted above is used, the input shaft 16 is rotated by an engine through the clutch 15 and the transmission gear 26 is moved in an appropriate direction so that the take-out shaft 27 is rotated in a given direction. The trunnions 6 are rocked and contact positions between the peripheries 8*a*" of the power roller 8" and the inner surfaces 2*a* and 4*a* of the input disks 2'" and 4'" are changed so that rotation speed ratio between the input shaft 16 and the take-out shaft 27.

At the time of operation of the toroidal type continuously variable transmission described above, the pressure device 9" presses the input disk 2'" toward the output disk 4'". As a result, the input shaft 16 supporting the cam plate 10' of the pressure device 9" is given a rightward thrust load in FIG. 12, which is the reaction force caused by the pressure of the pressure device 9". The thrust load is supported by the ball bearing 22 through a nut 30 threaded around the end of the input shaft 16, a disklike spring 34 and the sleeve 23. The pressure device 9" also generates a leftward thrust load in FIG. 12, which is transmitted through the input disk 2'", the output disk 4'" and the power rollers 8" to the shaft 18. This thrust load is absorbed by the ball bearing 20 through a stopper ring 33 fitted around the output shaft 18.

In FIG. 12, reference numeral 31 denotes a clutch for an engine brake and 32 denotes a direct coupling clutch. As the structure and functions of these components which are not included in the scope of the present invention are recorded in the above-mentioned Japanese Utility Model Application No. 61-87523 (Japanese Laid-Open Utility Model Application No. 62-199557), detailed description thereof is omitted.

In the conventional toroidal type continuously variable transmission concretely described above, the input shaft and the output shaft are not arranged coaxially but in parallel with each other. Power transmission means such as a Gear, a chain, and so on is provided between the output disk and the output shaft, which may inevitably increase the size and the weight of the toroidal type continuously variable transmission.

ThouGh the input shaft 1 and the output shaft 3 are coaxially arranged in FIGS. 10 and 11 which only illustrate the principle of the toroidal type continuously variable transmission, the radial load and the thrust load given to the shafts 1 and 3 can not be effectively supported in that arrangement. Accordingly, the construction shown in FIGS. 10 and 11 can not be practically applied to the transmission for an automobile because of many problems such as insufficient rigidity. The toroidal type continuously variable transmission according to the present invention was devised in order to solve such problems.

SUMMARY OF THE INVENTION

In order to solve the above-mentioned problems, the toroidal type continuously variable transmission according to the present invention comprises:

- a first rotation shaft;
- a first disk arranged coaxially with said first rotation shaft which has a toroidal surface and is rotated together with the first rotation shaft;
- a second rotation shaft arranged coaxially with the first rotation shaft;
- a second disk arranged coaxially with both the first disk and said second rotation shaft which has a toroidal surface facing toward said toroidal surface of said first disk and is rotated together with the second rotation shaft, said second disk being provided coaxially with said first disk;
- a trunnion rockable around a pivot arranged in the diagonal position with respect to the axis of the first and second disks;
- a power roller rotatably supported by the trunnion and rotatably pressed against the toroidal surfaces of the first and second disks to transmit power between the disks; and
- means provided in the first rotation shaft to support the thrust load and the radial load given to the first and second rotation shaft.

More specifically, the toroidal type continuously variable transmission according to the present invention comprises:

- a first rotation shaft serving as one of an input shaft and an output shaft;
- a first disk which is arranged coaxially with the first rotation shaft and rotated together with the first rotation shaft;
- a second disk which is arranged coaxially with the first disk and supported so as to rotate with respect to the first disk;
- a second rotation shaft which is arranged coaxially with the second disk and is rotated together with the second disk to serve as the other of the input shaft and the output shaft;
- a pressure device for pressuring one of the first and second disks toward the other at the time of operation;
- trunnions rocked around pivots arranged in diagonal positions with respect to the axes of the input disk and the output disk; and
- power rollers which are rotatably supported by the trunnions and held between the input disk and the output disk.

One end portion of the first rotation shaft is rotatably fitted into the second disk and the end portion of the first rotation shaft has a projection on a surface opposed to the second disk and a roller bearing is provided between the projection and the second disk or the pressure device. The roller bearing allows the first rotation shaft to rotate with respect to the second disk or the pressure device and the roller bearing supports the radial and thrust loads given between the first rotation shaft and the second disk or the pressure device.

In the toroidal type continuously variable transmission having the above-mentioned construction, the ratio of the rotating speeds of the first rotation shaft serving as either the input shaft or the output shaft and the second rotation shaft serving as the other are changed in the same way as that employed in the conventional construction described before.

In the toroidal type continuously variable transmission according to the present invention, the first rotation shaft and the second rotation shaft are arranged coaxially with each other. As a result, an additional power transmission mechanism which may cause power loss is not required. Accordingly, it is possible to reduce the size and the weight of the transmission. Moreover, sufficient rigidity of each components can be obtained even when the first and second rotation shafts are coaxially arranged.

DESCRIPTION OF THE PREFERRED EMBODIMENTS

Figure 1:
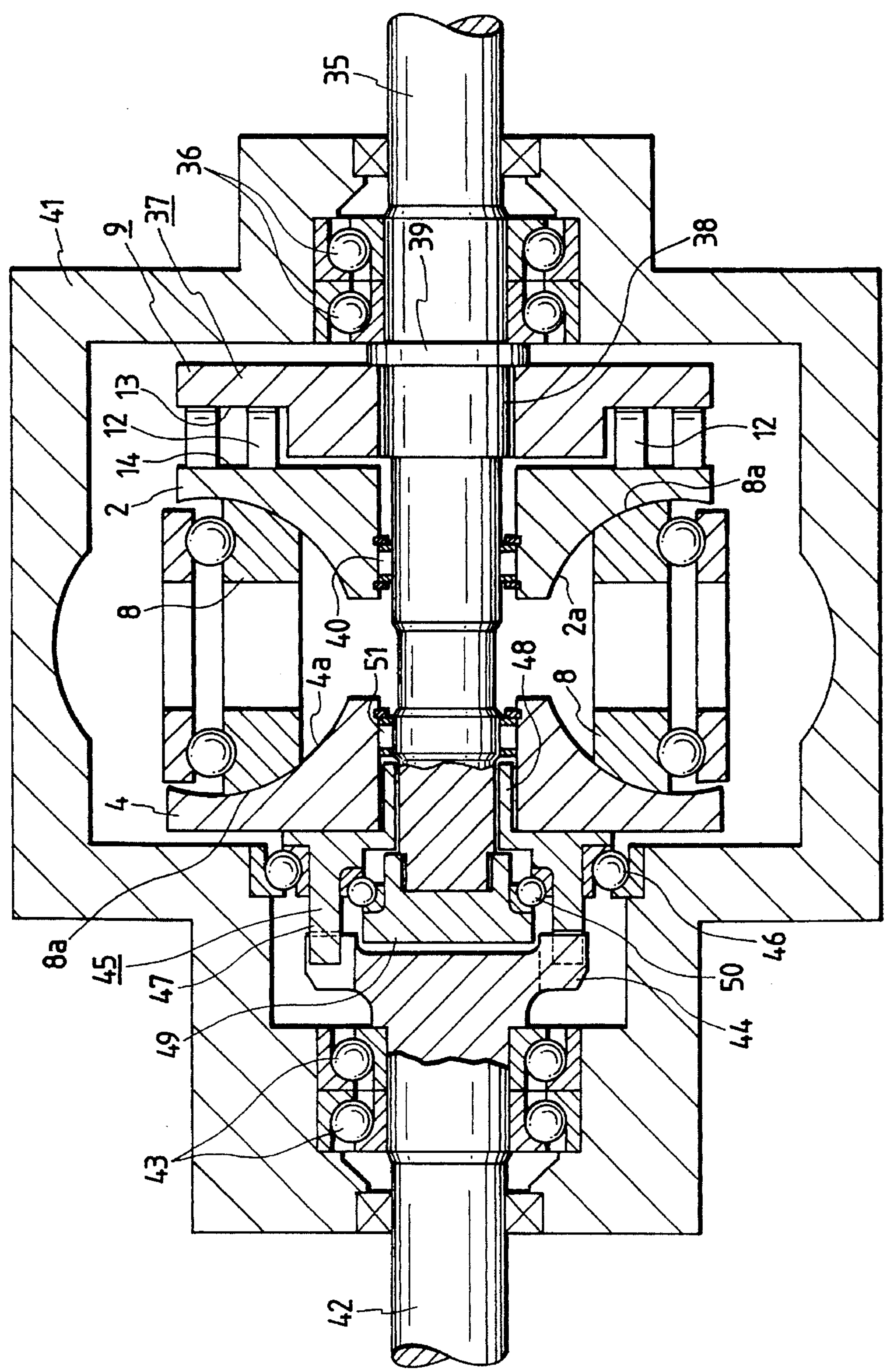
FIG. 1 is a cross-sectional view showing a first embodiment according to the present invention.

FIG. 1 shows a first embodiment according to the present invention. A first shaft or an input shaft 35 has its base end portion (right end in FIG. 1) connected with the crank shaft of the engine and is driven by the crank shaft. The input shaft 35 is rotatably supported by an end portion (right end portion in FIG. 1) of a housing 41 through a pair of angular contact ball bearings 36.

A cam plate 37 is provided at an intermediate portion of the input shaft 35. The cam plate 37 is supported by a spline engaging portion 38 and a collar portion 39 so that the rotation of the input shaft 35 is not allowed and to restrict shifting, of the cam plate 37 in the axial direction. A first disk or an input disk 2 is provided at an intermediate portion of the input shaft 35 at a part close to an end (on the left side of the cam plate 37 as shown in FIG. 1). The input disk 2 is supported by a needle bearing 40.

A pressure device 9 comprises the cam plate 37; the input disk 2; and a plurality of rollers 12 held between a cam surface 13 formed on the front surface (on the left surface in FIG. 1) of the cam plate 37 and a cam surface 14 formed on the rear surface of the input disk 2. By means of the pressure device 9, the input disk 2 is rotated together with the input shaft 35, while pressed toward an output disk 4 when the input shaft 35 rotates.

On the other side of the housing 41, a second rotation shaft or an output shaft 42 is rotatably supported by a pair of angular contact ball bearings 43. A collar portion 44 is formed at an inner end (at the right end in FIG. 1) of the output shaft 42 and the outer peripheral portion of the collar portion 44 is provided with gear-shaped projections and recesses.

At a portion slightly close from the collar portion 44 to a center and inside the housing 41 an output ring 45 is rotatably supported by an angular contact ball bearing 46. An output cylindrical portion 47 is formed coaxially with both the input shaft 35 and the output shaft 42 on one surface (a left surface in FIG. 1) of the output ring 45. Projections and recesses formed at the end of the output cylindrical portion 47 are engaged with the gear-shaped projections and recesses so that the output shaft 42 is rotated in accordance with the output ring 45.

At an inner edge of the other surface (on the right surface in FIG. 1) of the output ring 45, an input cylindrical portion 48 is formed coaxially with the input shaft 35 and the output shaft 42 and an inner diameter of the input cylindrical portion 48 is slightly larger than an outer diameter of the end of the input shaft 35. Accordingly, the end of the input shaft 35 is loosely fitted into the inside of the input cylindrical portion 48 and projects into the interior of the output cylindrical portion 47.

A member, such as loading nut 49, is threaded to the end of the input shaft 35 projecting into the interior of the output cylindrical portion 47. An angular contact ball bearing 50 is provided between the periphery of the loading nut 49 and the output cylindrical portion 47 so that the input shaft 35 and the output ring 45 can rotate with respect to each other and that the radial load and the thrust load given to the input shaft 35 and the input ring 45 are supported.

The outer peripheral surface of the input cylindrical portion 48 is spline-engaged with a portion of the inner peripheral surface of the output disk 4. A needle bearing 51 is provided between the rest of the inner-peripheral surface of the output disk 4 and the outer periphery of the input shaft 35. Thus, the output disk 4 and the output ring 45 are supported around the end portion of the input shaft 35 rotatably with respect to the input shaft 35.

Figure 10:
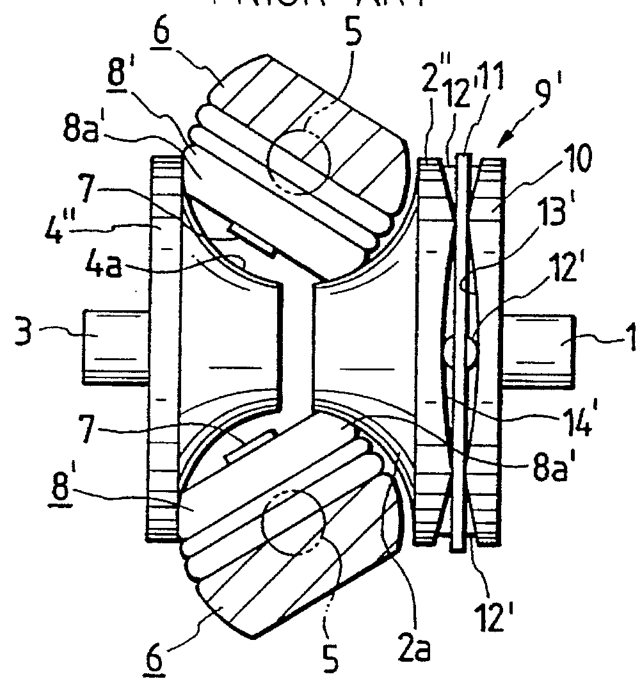
FIG. 10 is a side view showing construction of a conventional toroidal type continuously variable transmission at the time of the maximum deceleration operation.
Figure 11:
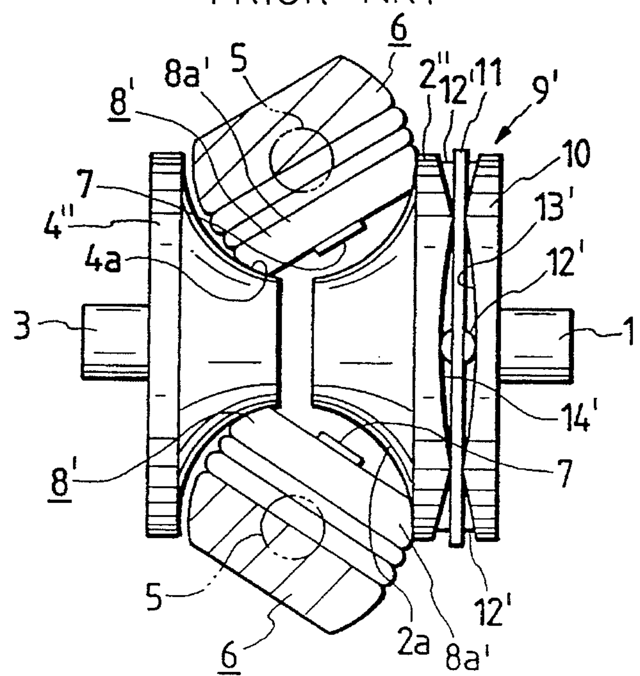
FIG. 11 is a side view showing the transmission of FIG. 10 at the time of the maximum acceleration operation.
Figure 12:
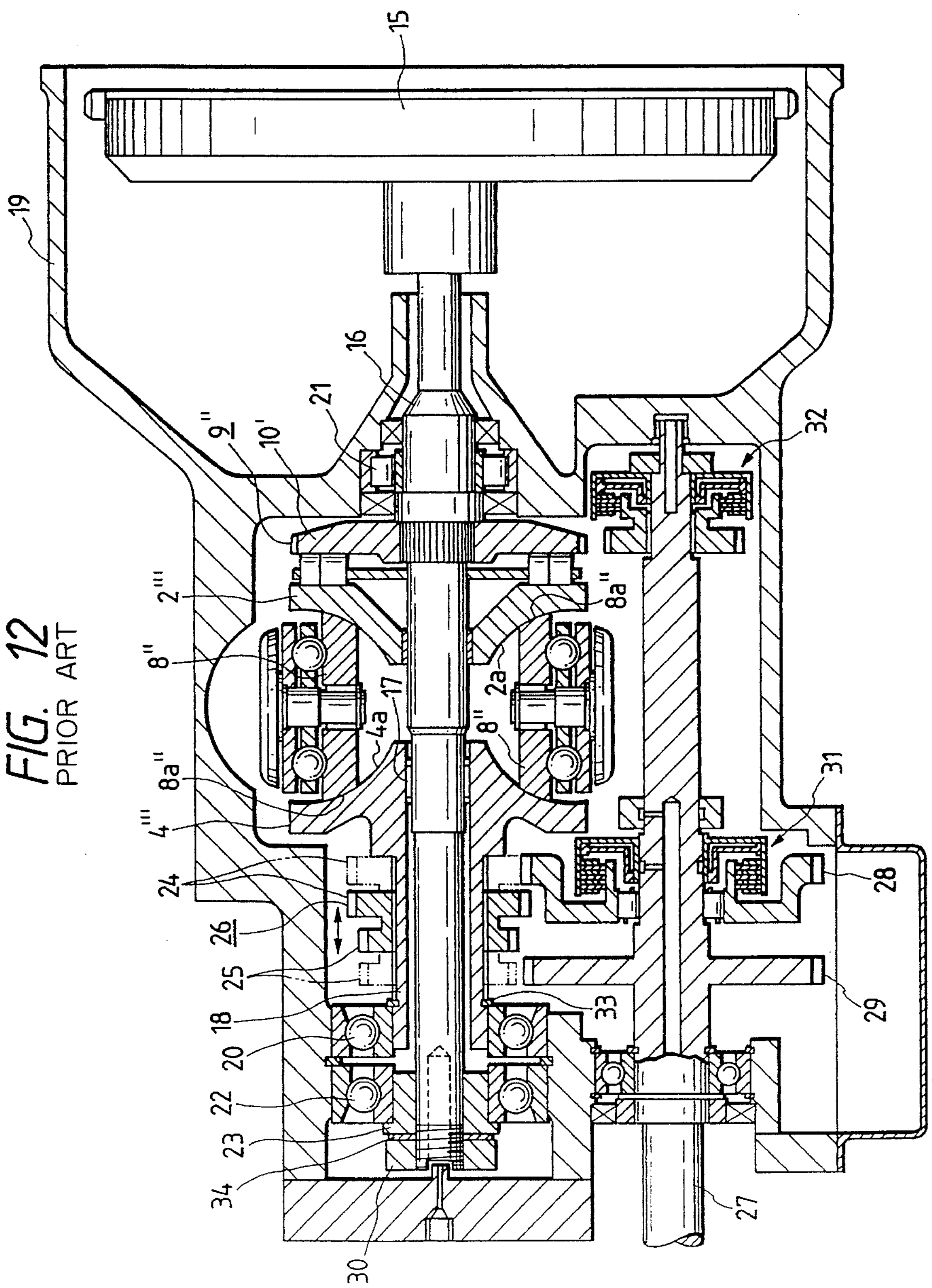
FIG. 12 is a cross-sectional view showing a concrete example of the construction of a conventional toroidal type continuously variable transmission.

Further, trunnions 6 (see FIGS. 10 and 11 because they are not shown in FIG. 1) are provided between the input disk 2 and the output disk 4. The trunnions 6 are rockable around their respective pivots 5 (see FIGS. 10 and 11) arranged in the diagonal positions with respect to the center axes of the both disks 2 and 4. Power rollers 8 which are rotatably supported around their respective shiftable shafts 7 (see FIGS. 10 and 11) fixed to their respective trunnions 6 are pinched between the input disk 2 and the output disk 4. The peripheral surfaces 8*a* of the power rollers 8 are pressed against the inner surface 2*a* of the input disk 2 and the inner surface 4*a* of the output disk 4.

In the toroidal type continuously variable transmission according to the present invention having the above-mentioned construction, the torque is transmitted between the input shaft (first rotation shaft) and the output shaft (the second shaft) in the substantially same way as that of the conventional construction. Also the ratio of the rotating speeds of the shafts is changed in substantially the same way as that of the conventional construction.

More specifically, the pressure device 9 transmits the torque of the input shaft 35 to the input disk 2. The input disk 2 pressed toward the output disk 4 (pressed leftward in FIG. 1) is rotated together with the input shaft 35. Thus, the power rollers 8 whose peripheral surfaces 8*a* are pressed against the inner surface 2*a* (toroidal surface) of the input disk 2 are rotated around their respective shiftable shafts 7. As the peripheral surfaces 8*a* are also pressed against the inner surface 4*a* (toroidal surface) of the output disk 4, the torque of the input disk 2 is transmitted to the output disk 4 through the power rollers 8. Further, the torque of the output disk 4 is transmitted through the output ring 45 to an output shaft 42. In order to change the ratio of the rotating speeds of the input shaft 35 and the output shaft 42, the trunnions 6 are rotated around their respective pivots 5.

As pressure is generated by the pressure device 9 at the time of the operation of the toroidal type continuously variable transmission and the pressure is transmitted from the input disk 2 to the output disk 4 through the power rollers 8 pressed against both disks 2 and 4, the radial load and the thrust load are given to all these components. These loads are supported by the bearings 36, 40, 43, 46, 50 and 51 which support these components.

As the input shaft 35 (first rotation shaft) and the output shaft 42 (second rotation shaft) are arranged coaxially with each other in the toroidal type continuously variable transmission according to the present invention, an additional power transmission mechanism which may cause power loss is not required, which reduces the size and the weight of the transmission. Further, sufficient rigidity of each component can be obtained even when the input shaft 35 and the output shaft are coaxially arranged.

Figure 2:
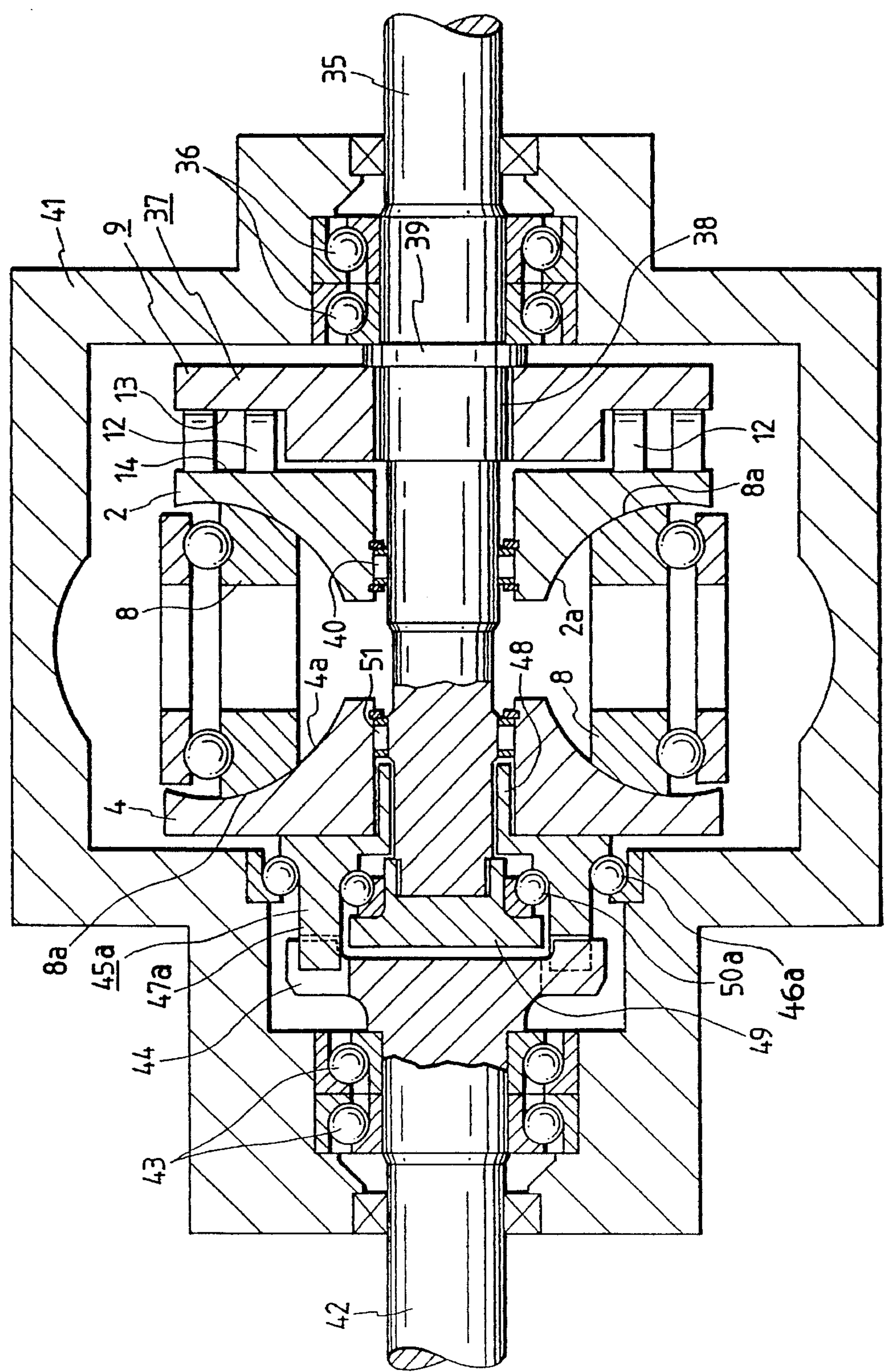
FIG. 2 is a cross-sectional view showing a second embodiment according to the present invention.

FIG. 2 shows a second embodiment according to the present invention. In this embodiment, an inner race of the ball bearing 46*a* is integrally formed on the outer peripheral surface of the base end portion of the output cylindrical portion 47*a* of the output ring 45*a*, while the outer race of the ball bearing 50*a* is integrally formed on the inner peripheral surface of the basement portion of the output cylindrical portion 47*a*. Thus separate races can be omitted. The other components and their functions are the same as or similar to those of the above-mentioned first embodiment. Therefore, the same components are denoted by the same reference numerals as the first embodiment and similar components are denoted by the same reference numerals but with different suffixes, and description of them will not be repeated.

Figure 3:
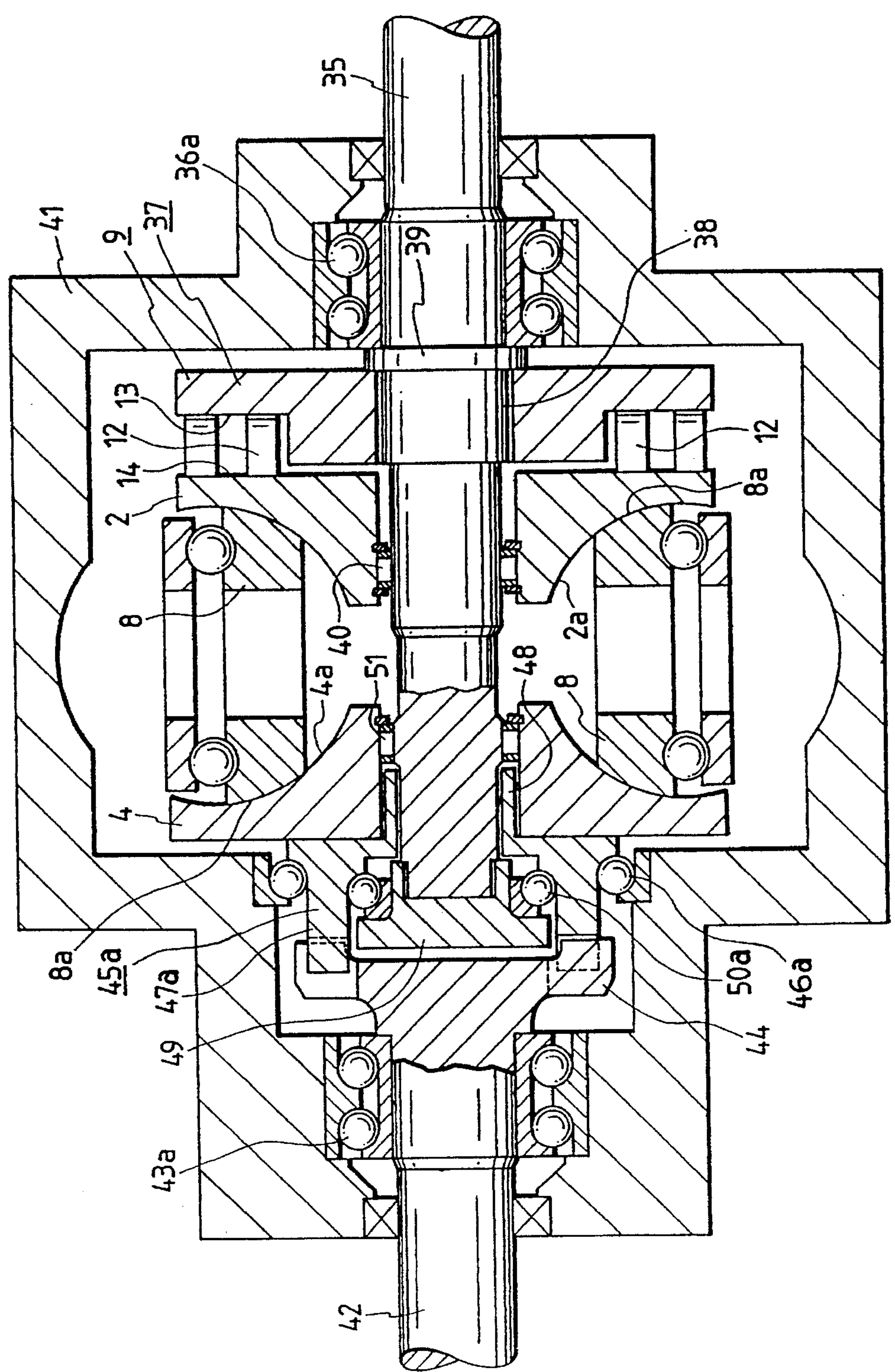
FIG. 3 is a cross-sectional view showing a third embodiment according to the present invention.

FIG. 3 shows a third embodiment according to the present invention. In this embodiment, the input shaft 35 is supported in the housing 41 by a double row angular contact ball bearing 36*a*, while the output shaft 42 is supported in the housing 41 by a double row angular contact ball bearing 43*a*. The other components and their functions are the same as or similar to those of the above-mentioned second embodiment. Therefore, the same components are denoted by the same reference numerals as the second embodiment and similar components are denoted by the same reference numerals but with different suffixes, and description of them will not be repeated.

Figure 4:
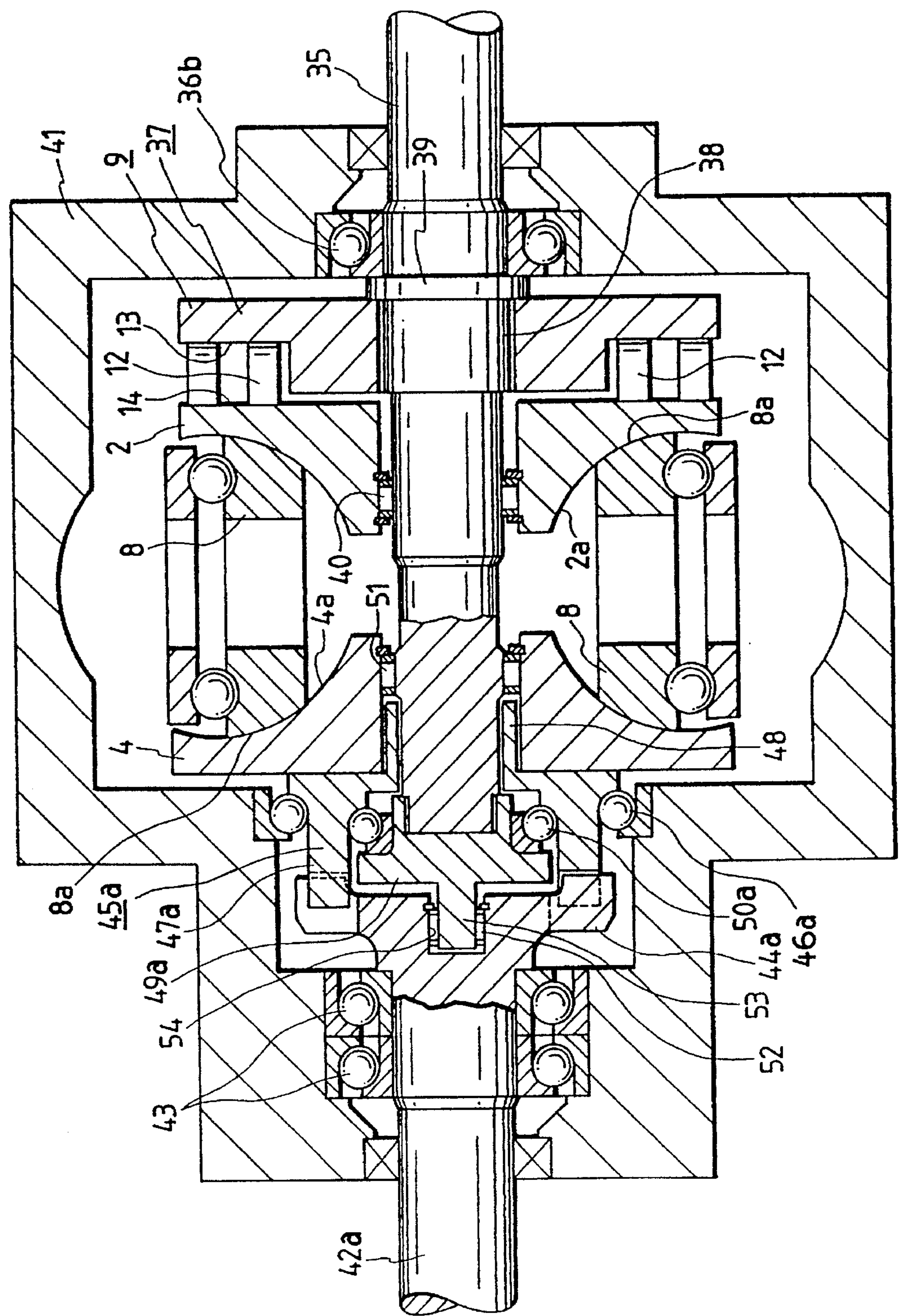
FIG. 4 is a cross-sectional view showing a fourth embodiment according to the present invention.

FIG. 4 shows a fourth embodiment according to the present invention. In this embodiment, the base end portion of the input shaft 35 is supported in the housing 41 through a single row ball bearing 36*b* and a column portion 53 is fixedly formed on the end face of the loading nut 49*a* which is fixed to the end portion of the input shaft 35. Further a recess hole 54 is made in the inner end face of the output shaft 42*a* and a needle bearing 52 is provided between the outer peripheral surface of the column portion 53 and the inner peripheral surface of the recess hole 54. The other components and their functions are the same as or similar to those of the above-mentioned second embodiment. Therefore, the same components are denoted by the same reference numerals as the second embodiment and similar components are denoted by the same reference numerals but with different suffixes, and description of them will not be repeated.

Figure 5:
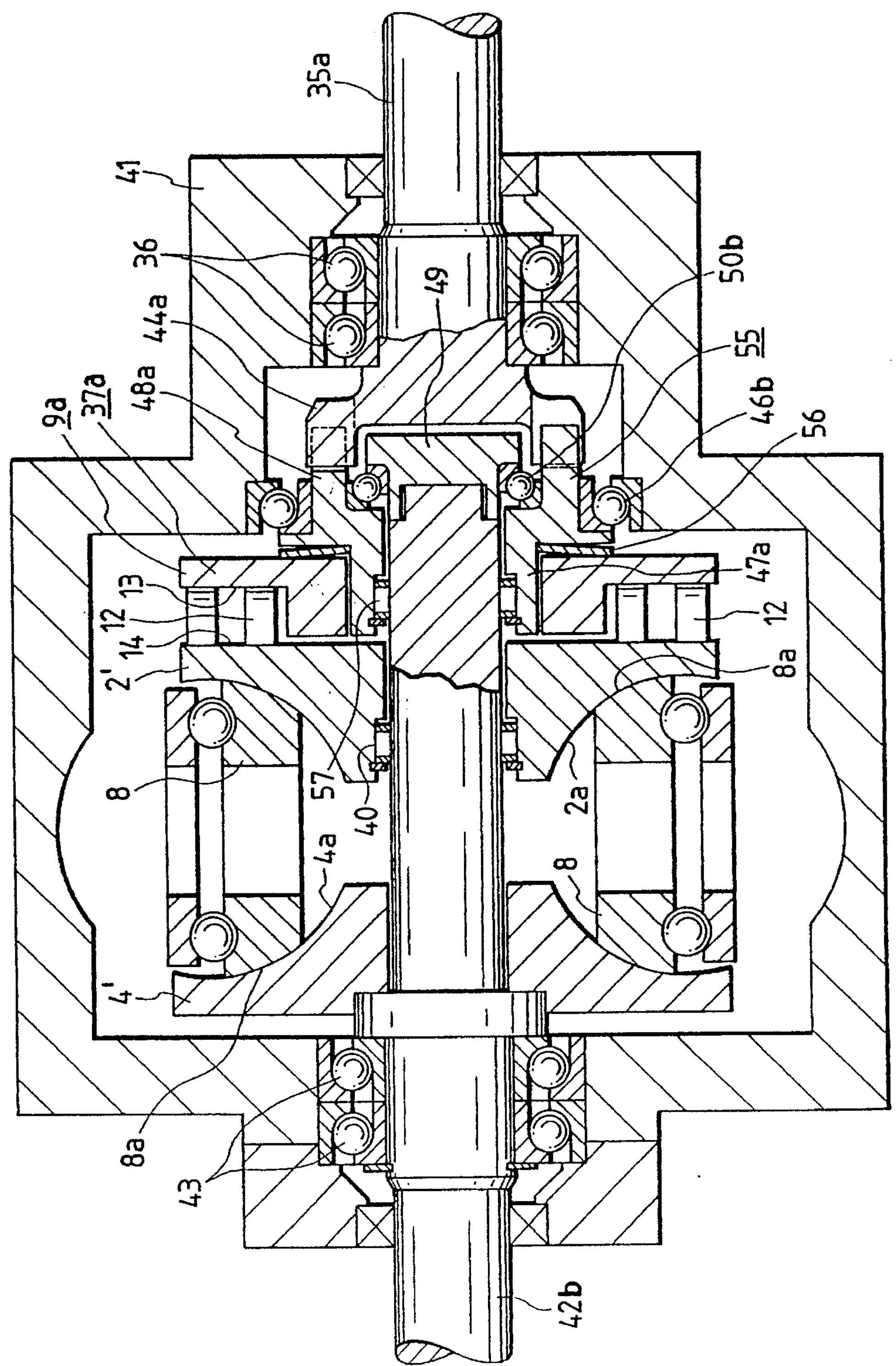
FIG. 5 is a cross-sectional view showing a fifth embodiment according to the present invention.

FIG. 5 shows a fifth embodiment according to the present invention. This embodiment is different from the above-mentioned first to fourth embodiments in that an output shaft 42*b* has the same construction as the first rotation shaft of the above-mentioned embodiments and that an input shaft 35*a* has the same construction as the second rotation shaft of the above-mentioned embodiments. As a result, a collar portion 44*a* is formd at a rear end (at the left end in FIG. 5) of the input shaft 35*a* in order to rotatably support an input ring 55 around the end portion of the output shaft 42*b*. The front edge of an input cylindrical portion 48*a* formed on the input ring 55 is projection-to-recess engaged with the outer periphery of the collar portion 44*a* so that torque can be transmitted between the input shaft 35*a* and the input ring 55.

A cam plate 37*a* is supported through splines around the periphery of an output cylindrical portion 47*a* formed on the input ring 55. A disklike spring 56 elastically presses the cam plate 37*a* toward an input disk 2. Further, a needle bearing 57 is provided between the inner peripheral surface of the output cylindrical portion 47*a* and the outer peripheral surface of the end portion of the output shaft 42*b*. As described here, this embodiment has construction different from that of the first embodiment described before because the input shaft and the output shaft exchange their functions in the construction. Accordingly some modifications are required. For example, the front end portion of the output shaft 42*b* is fitted into the interior of the input disk 2', and so on. The rest of the components and their functions are, however, the same as or similar to those of the first embodiment. Therefore, the same components are denoted by the same reference numerals as the first embodiment and similar components are denoted by the same reference numerals but with different suffixes, and description of them will not be repeated.

Figure 6:
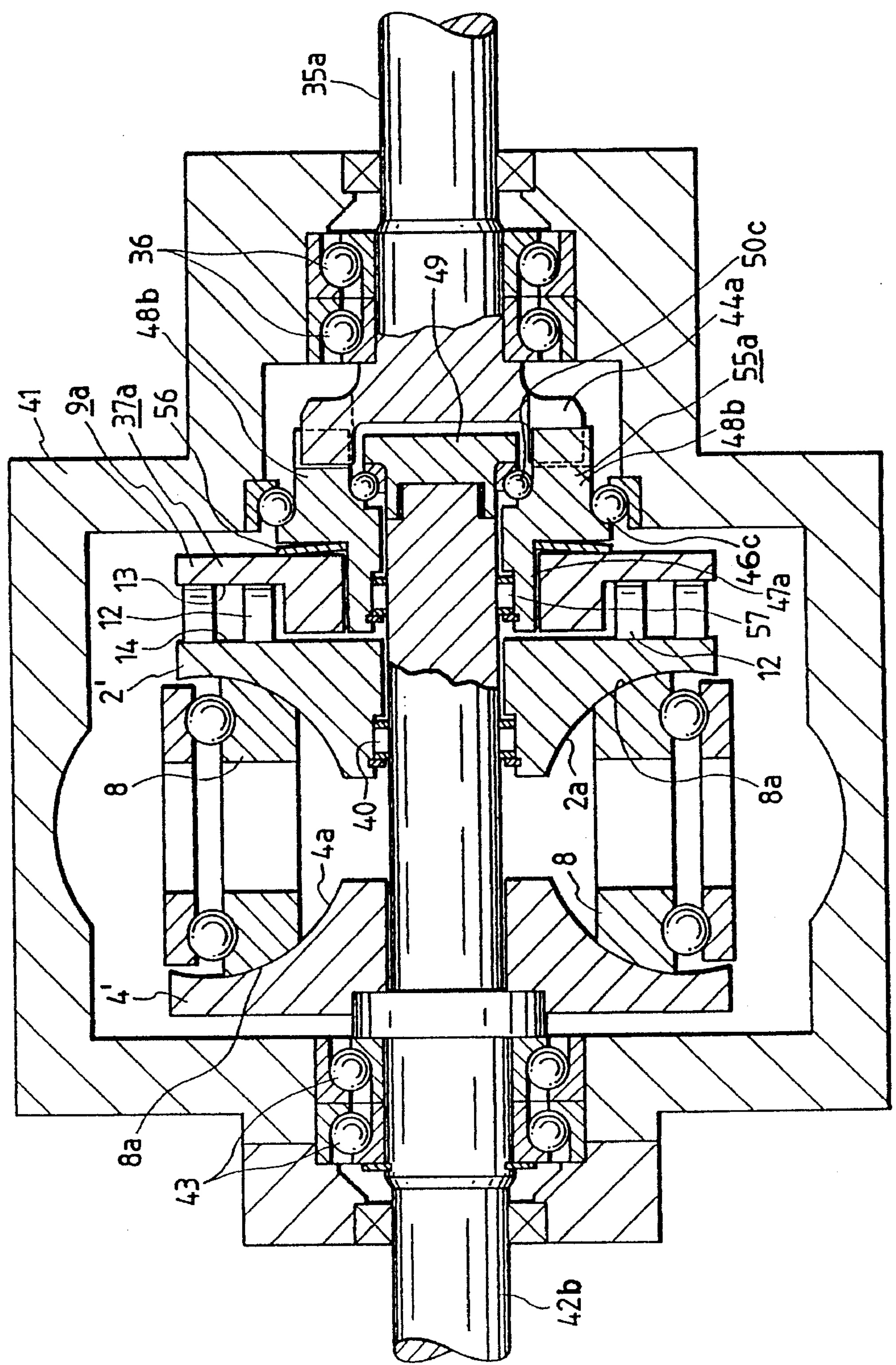
FIG. 6 is a cross-sectional view showing a sixth embodiment according to the present invention.

FIG. 6 shows a sixth embodiment according to the present invention. In this embodiment, the inner race of the ball bearing 46*c* is integrally formed on the outer peripheral surface of the base end portion of the input cylindrical portion 48*b* of the input ring 55*a*, while the outer race of the ball bearing 50*c* is integrally formed on the inner peripheral surface of the base end portion of the input cylindrical portion 48*b*. Thus, separate races can be omitted. The other components and their function are the same as or similar to those of the above-mentioned fifth embodiment. Therefore, the same components are denoted by the same reference numerals as the fifth embodiment and similar components are denoted by the same reference numerals but with different suffixes, and description of them will not be repeated.

Figure 7:
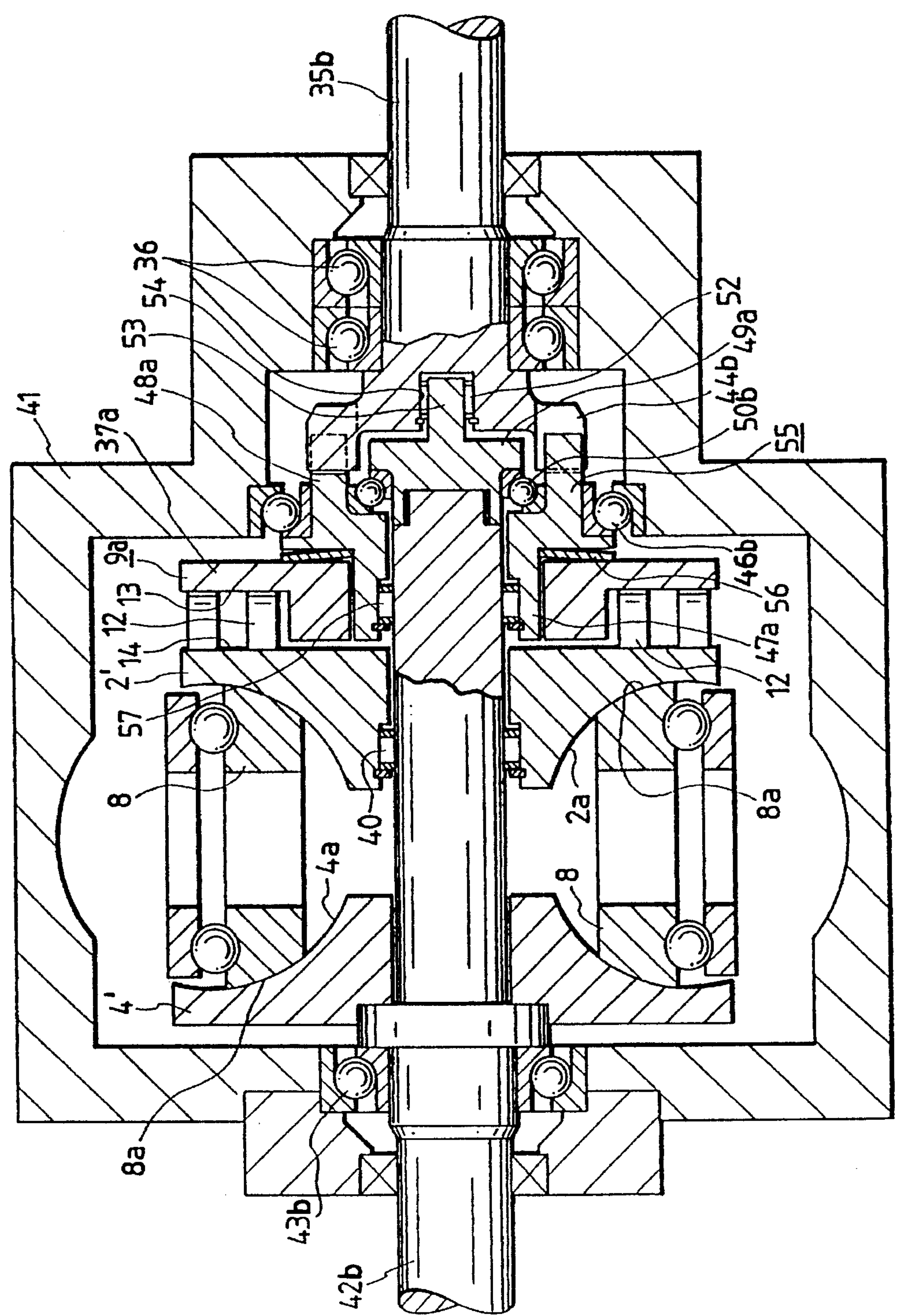
FIG. 7 is a cross-sectional view showing a seventh embodiment according to the present invention.

FIG. 7 shows a seventh embodiment according to the present invention. In this embodiment, the output shaft 42*b* is supported by the housing 41 through a single row ball bearing 43*b* and a column portion 53 is fixedly formed on the end face (on the right end face in FIG. 7) of the loading nut 49*a* which is fixed to the inner end portion of the output shaft 42*b*. Further, a socket hole 54 is made in the inner end face of the input shaft 35*b*, and a needle bearing 52 provided between the outer peripheral surface of the column portion 53 and the inner peripheral surface of the socket hole 54 indirectly supports the inner end portion of the output shaft 42*b*, which compensates for replacement of a pair of angular contact ball bearings 43 with the single row ball bearing 43*b*. The other components and their functions are the same as or similar to those of the above-mentioned fifth embodiment. Therefore, the same components are denoted by the same reference numerals as the fifth embodiment and similar components are denoted by the same reference numerals but with different suffixes, and description of them will not be repeated.

Figure 8:
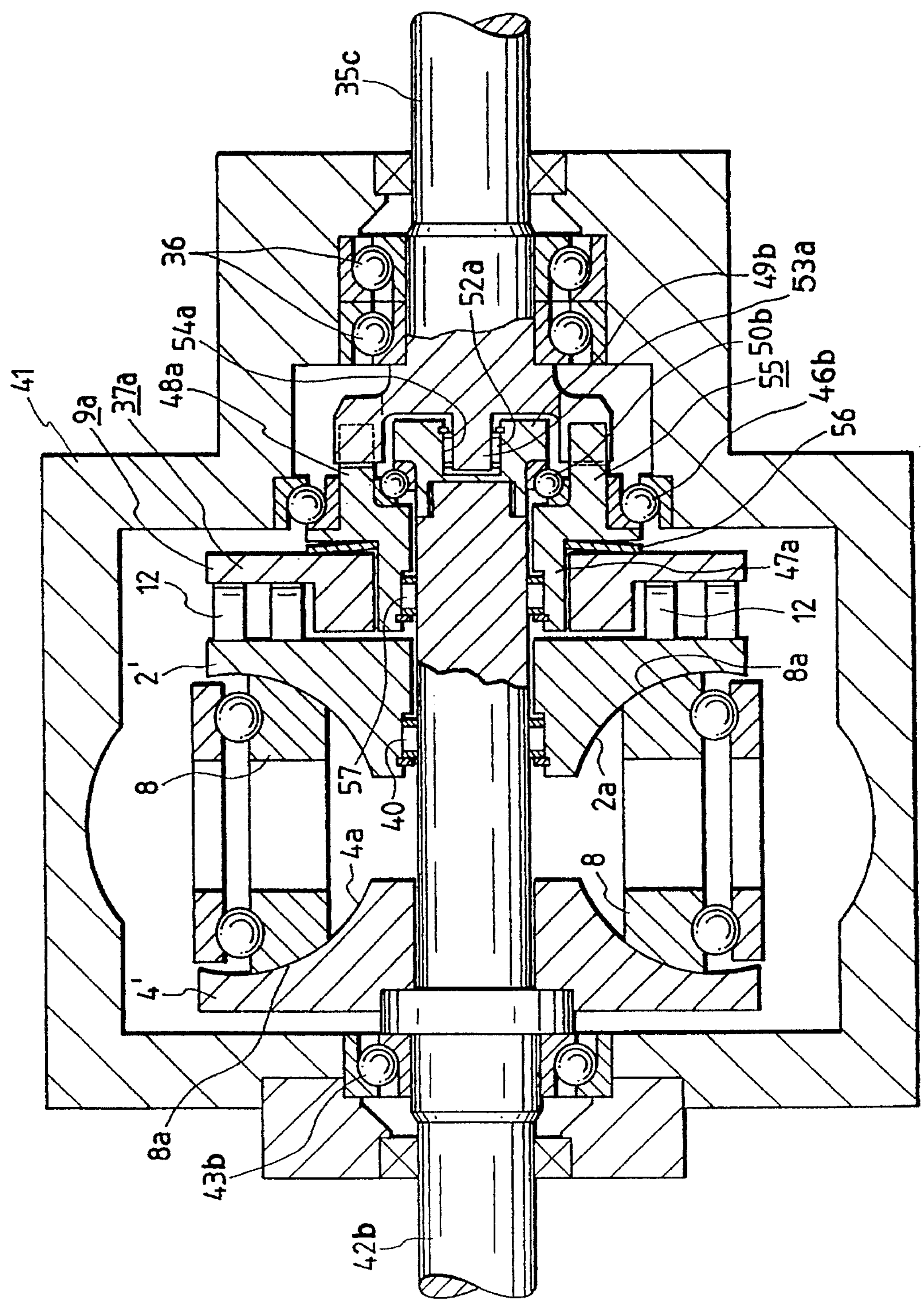
FIG. 8 is a cross-sectional view showing an eighth embodiment according to the present invention.

FIG. 8 shows an eighth embodiment according to the present invention. This embodiment differs from the above-mentioned seventh embodiment in that the recess hole 54*a* is formed in the output shaft 42*b* instead of the column portion 53*a* and that the column portion 53*a* is formed at the inner end of the input shaft 35*c*. Thus, the inner end of the output shaft 42*b* is supported so as to rotate with respect to the input shaft 35*c*. The other components and their functions are the same as or similar to those of the seventh embodiment. Therefore, the same components are denoted by the same reference numerals as the seventh embodiment and similar components are denoted by the same reference numerals but with different suffixes, and description of them will not be repeated.

Figure 9:
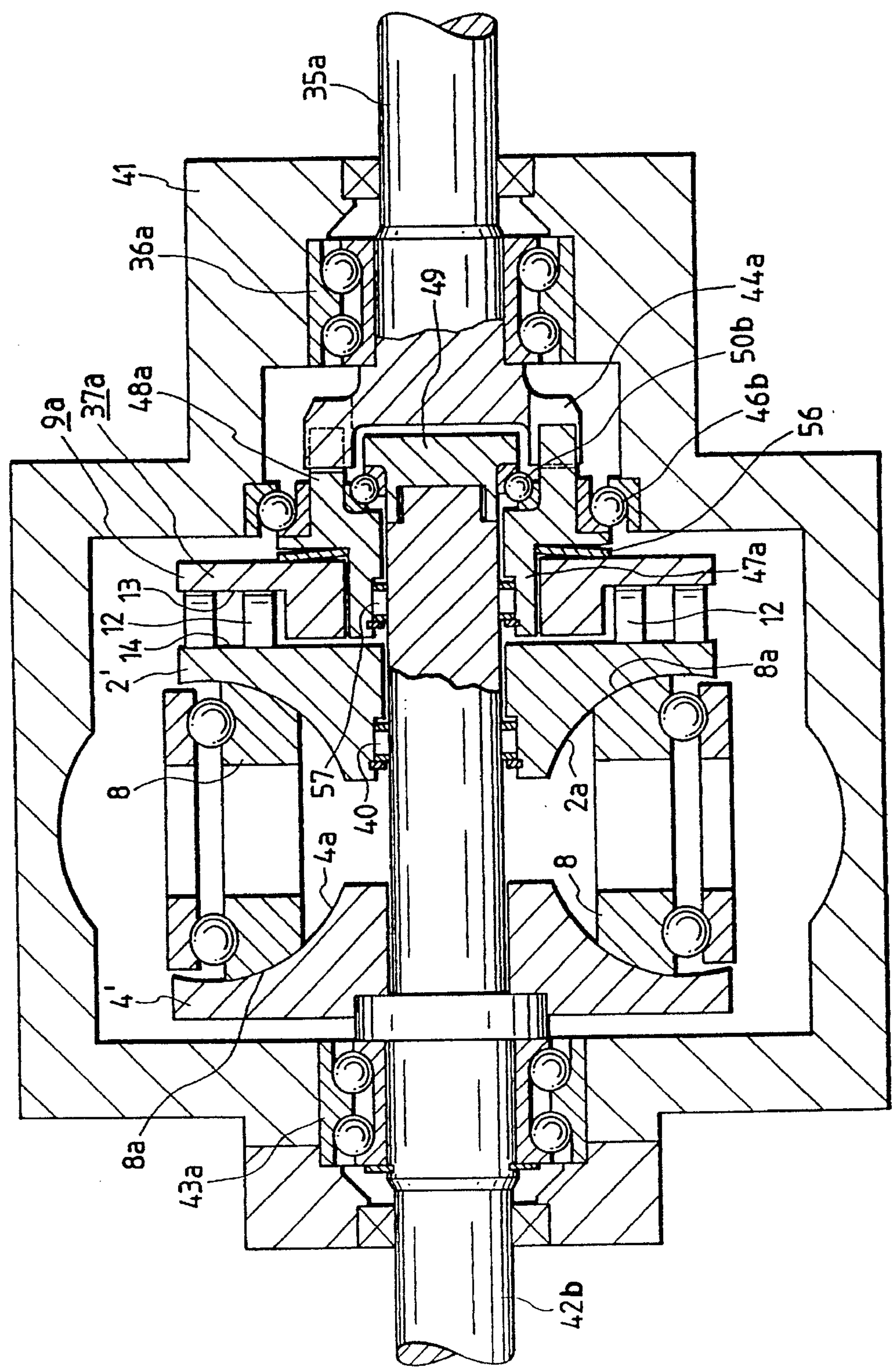
FIG. 9 is a cross-sectional view showing a ninth embodiment according to the present invention.

FIG. 9 shows a ninth embodiment according to the present invention. In this embodiment, the input shaft 35*a* is supported in the housing 41 by a double row angular contact ball bearing 36*a*, while the output shaft 42*b* is supported in the housing 41 by a double row angular contact ball bearing 43*a*. The other components and their functions are the same as or similar to those of the above-mentioned fifth embodiment. Therefore, the same components are denoted by the same reference numerals as the fifth embodiment and similar components are denoted by the same reference numerals but with different suffixes, and description of them will not be repeated.

The toroidal type continuously variable transmission according to the present invention which has the above-mentioned construction and the above-mentioned functions can be of small size and of light weight- In addition, loss of power is small.

What is claimed is:

1. A toroidal type continuously variable transmission comprising:

a first rotation shaft;

a first disk having a toroidal surface and disposed coaxially with said first rotation shaft, said first disk being connected to said first rotation shaft to rotate integrally therewith;

a second rotation shaft disposed coaxially with said first rotation shaft;

a second disk having a toroidal surface facing said toroidal surface of said first disk, said second disk being disposed coaxially with both said first disk and said second rotation shaft and being connected to said second rotation shaft to rotate integrally therewith;

a trunnion rockable around a pivot axis transverse to the axis of said first and second disks;

a power roller rotatably supported by said trunnion and rotatably pressed against said toroidal surfaces of said first and second disks to transmit power between said first and second disks; and means disposed between and cooperating with one of said first and second rotation shafts and the disk that rotates integrally with the other of said first and second rotation shafts for supporting thrust and radial loads on said first and second rotation shafts.

2. A toroidal type continuously variable transmission according to claim 1, wherein said first rotation shaft extends through said second disk and is rotatable relative to said second disk, and said supporting means includes a rolling bearing provided between said first rotation shaft and said second disk.

3. A toroidal type continuously variable transmission according to claim 2, including an output ring connected to said second disk to rotate integrally therewith and transmit power to said second rotation shaft, and wherein said rolling bearing is arranged between said first rotation shaft and said output ring.

4. A toroidal type continuously variable transmission according to claim 2, wherein said rolling bearing is an angular ball bearing.

5. A toroidal type continuously variable transmission according to claim 1, further comprising a pressure device for pressing one of said first disk and said second disk toward the other, and wherein said second rotation shaft extends through said pressure device and is rotatable relative to said pressure device, and said supporting means includes a rolling bearing provided between said second rotation shaft and said pressure device.

6. A toroidal type continuously variable transmission according to claim 5, including an input ring connected to said pressure device to rotate integrally therewith and transmit power from said first rotation shaft, and wherein said rolling bearing is provided between said second rotation shaft and said input ring.

7. A toroidal type continuously variable transmission according to claim 5, wherein said rolling bearing is an angular ball bearing.

8. A toroidal type continuously variable transmission comprising:

a first rotation shaft;

a first disk having a toroidal surface and disposed coaxially with said first rotation shaft, said first disk being connected to said first rotation shaft to rotate integrally therewith;

a second rotation shaft disposed coaxially with said first rotation shaft;

a second disk having a toroidal surface facing said toroidal surface of said first disk, said second disk being disposed coaxially with both said first disk and said second rotation shaft and being connected to said second rotation shaft to rotate integrally therewith;

a trunnion rockable around a pivot axis transverse to the axis of said first and second disks;

a power roller rotatably supported by said trunnion and rotatably pressed against said toroidal surfaces of said first and second disks to transmit power between said first and second disks;

an output ring connected to said second disk to rotate integrally therewith;

a member connected to said first rotation shaft to rotate integrally therewith, said member having a surface facing said output ring; and an angular ball bearing disposed between said output ring and said member.

9. A toroidal type continuously variable transmission comprising:

a first rotation shaft;

a first disk having a toroidal surface and disposed coaxially with said first rotation shaft, said first disk being connected to said first rotation shaft to rotate integrally therewith;

a second rotation shaft disposed coaxially with said first rotation shaft;

a second disk having a toroidal surface facing said toroidal surface of said first disk, said second disk being disposed coaxially with both said first disk and said second rotation shaft and being connected to said second rotation shaft to rotate integrally therewith;

a trunnion rockable around a pivot axis transverse to the axis of said first and second disks;

a power roller rotatably supported by said trunnion and rotatably pressed against said toroidal surfaces of said first and second disks to transmit power between said first and second disks;

an input ring connected to said first rotation shaft to rotate integrally therewith;

a member connected to said second rotation shaft to rotate integrally therewith, said member having a surface facing said input ring; and an angular ball bearing provided between said input ring and said member.

* * * * *